United States Patent [19]
Kohl

[11] Patent Number: 4,746,943
[45] Date of Patent: May 24, 1988

[54] FILM TRACKING MECHANISM

[75] Inventor: Roland W. Kohl, Hong Kong, Hong Kong

[73] Assignee: Dialbright Company, Ltd., Hong Kong, Hong Kong

[21] Appl. No.: 2,801

[22] Filed: Jan. 13, 1987

[30] Foreign Application Priority Data

Jan. 14, 1986 [GB] United Kingdom ............... 8600770

[51] Int. Cl.$^4$ .................... G03B 1/22; G03B 17/36
[52] U.S. Cl. .................... 354/215; 354/212; 354/217; 354/266; 226/62
[58] Field of Search ............... 354/204, 205, 206, 212, 354/213, 217, 215, 266; 352/191, 192, 193, 194, 196; 226/62, 67, 73

[56] References Cited

U.S. PATENT DOCUMENTS

| | | | |
|---|---|---|---|
| 1,403,106 | 1/1922 | Pittman | 226/67 |
| 3,765,583 | 10/1973 | Mathes | 226/67 |
| 4,203,335 | 5/1980 | Coffey | 226/62 |

Primary Examiner—A. A. Mathews
Attorney, Agent, or Firm—Amster, Rothstein & Ebenstein

[57] ABSTRACT

A single mechanism performs three or four functions in a camera, the advancement of a film (6) mounted therein being used to provide energy to the mechanism. A tracking pin (2) is guided in a track (3) causing a tracking member (1) to move in a cyclic manner. For part of the cycle, a clawed end (4) of the tracking member (1) is in engagement with the film (6), the advancement of which causes movement of the tracking pin (2) along the forward portion (3a) of the track (3), and extension of a first tension spring (12). On movement of a shutter release lever (11) the tracking pin (2) moves rapidly along the remaining rear portion (3b) of the track (3) under the action of the tension springs (12, 13). A frame counter mechanism (7, 8, 9, 10) is actuated by the tracking member (1) at a convenient point. The shutter mechanism is also activated at a suitable point after operation of the shutter release lever (11).

10 Claims, 3 Drawing Sheets

FILM TRACKING MECHANISM

The invention relates to a camera, particularly a 35 mm camera.

BACKGROUND OF THE INVENTION

The wider availability and superior quality of 35 mm camera film over other film types such as the 110 cartridge, has produced an increasing popularity of this type of film. However, since the 35 mm film is not contained in a rigid cartridge, the mechanisms required within a 35 mm camera are more complex than those contained in a camera taking 110 cartridges. Thus the 35 mm camera is more expensive than a 110 cartridge camera.

An object of the invention is to reduce the number of mechanical components required within a camera such that manufacturing costs may be reduced.

SUMMARY OF THE INVENTION

This is achieved by the provision of a film tracking mechanism for a camera, comprising a track having forward and rear portions, a tracking member, means on said tracking member for slidably and pivotably mounting said tracking member in said camera, a tracking pin on said tracking member engaging said track for slidable movement therealong, means on said tracking member for engagement with a film during movement of said tracking pin along said forward portion, and means for disengaging said tracking means from said film and for moving said tracking pin along said rear portion. Means for releasing and actuating a shutter mechanism and a frame counter mechanism are preferably also provided, thereby allowing four operations to be performed by one mechanism; namely film positioning, frame counting, shutter release and shutter actuation.

BRIEF DESCRIPTION OF THE DRAWINGS

As embodiment of the invention will now be described with reference to the accompanying drawings, in which.

DETAILED DESCRIPTION OF THE DRAWINGS

Figure 1:
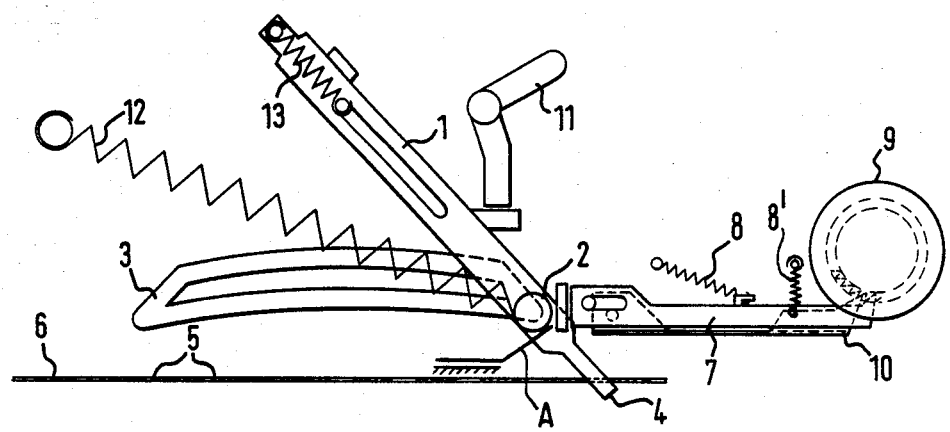
FIG. 1 shows a diagrammatic plan view of the complete film tracking mechanism.

FIG. 1 shows a film tracer or tracking member 1 having a tracking pin 2 which engages with a track 3. An end 4 of the tracking member 1 engages with one of a row of perforations 5 at the edge of a film 6 during movement of the tracking pin 2 along part of the track 3.

A frame counter mechanism comprises a frame counter lever 7, which is connected to springs 8 and 8', together with a frame counter wheel 9 and ratchet 10. A pivotable shutter release lever 11 prevents movement of the tracking member 1 under the action of a first tension spring 12, a second tension spring 13 and a leaf spring A until such movement is desired.

Shutter actuation means and a shutter mechanism are not shown here but are described in detail below.

Figure 2:
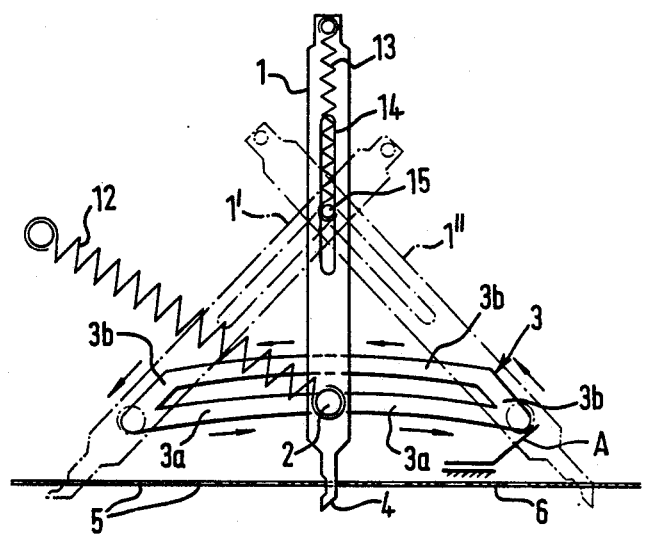
FIG. 2 shows diagrammatically part of the film tracking mechanism of FIG. 1.

The track 3 is shaped such that the movement of the tracking pin 2 along the track 3 is cyclic. As can be seen in FIG. 2, the track 3 has a forward portion 3a and a rear portion 3b. The direction of travel of the tracking pin 2 in the track 3 is indicated by the arrows. The tracking member 1 has a slot 14 and is mounted so as to be slidable and pivotable about a pivot 15 in the camera such that the tracking pin 2 is movable in all parts of the track 3.

After a photograph has been taken by the camera operator, the tracking member 1 is in the position 1', shown in broken line. The claw 4 at the end of tracking member 1 protrudes through a perforation 5 in the film 6 and both tension springs 12 and 13 are substantially slack. As the film 6 is advanced by a manual or motorised process (not shown), the claw 4 is also advanced and hence the tracking member 1 is moved to the position 1", also shown in broken line. During this process, the tracking pin 2 moves along the forward portion 3a of the track 3 which is shaped such that the claw 4 moves in a straight line. The film 6 is tracked along the same straight line by being retained by the claw 4. The movement of the tracking member 1 from position 1' to position 1" causes the first tension spring 12 to extend while the second tension spring 13 is displaced by only a small amount and remains substantially slack. As the tracking pin 2 approaches the end of the forward portion 3a of the track 3, the pin 2 comes into contact with the leaf spring A and causes displacement and tensioning of the leaf spring A.

The tracking member 1 leaves the position 1" only when the shutter release lever 11 (FIG. 1) is operated. The tensions in the first tension spring 12 and the leaf spring A then cause the tracking member 1 to move rapidly along the rear portion 3b of the track 3. The shape of the rear portion 3b is such that the claw 4 is first withdrawn from the perforation 5 in the film 6 and the second tension spring 13 is tensioned. The tracking pin 2 then moves rapidly further along the rear portion 3b keeping the second tension spring 13 in tension. The tracking member 1 is returned rapidly to position 1' by the action of the second tension spring 13 such that the claw 4 engages with a further perforation 5 in the film 6. As the movement of the tracking pin 2 along the rear portion 3b is completed, the shutter mechanism (not shown) is actuated and a photograph is taken automatically.

Figure 3:
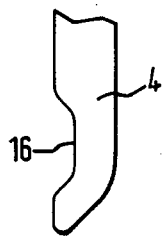
FIG. 3 shows an enlarged plan view of the claw of the tracking member which forms part of the film tracking mechanism of FIG. 1.

The claw 4 having groove 16 is shown in detail in FIG. 3. Penetration of the claw 4 through a perforation is such that the film engages with the groove 16. The film will then be retained by the claw 4 and tracked positively thereby during forward movement of the film.

Figure 4:
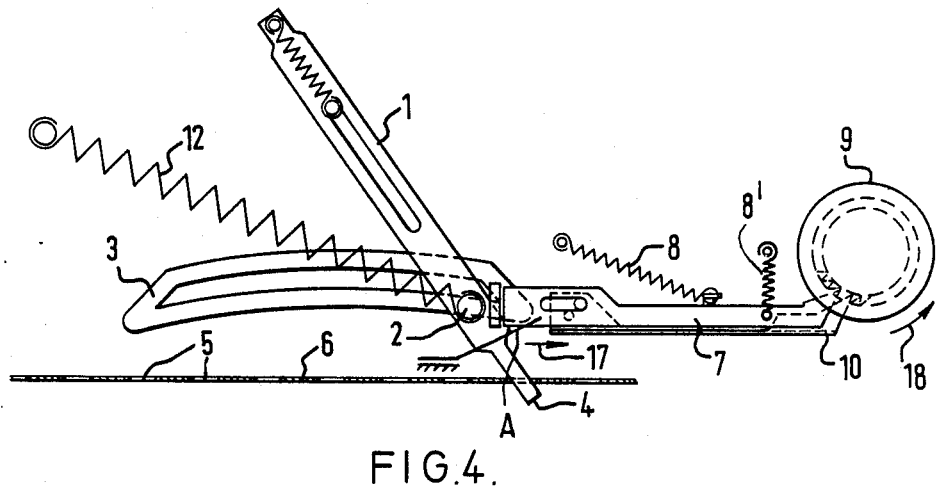
FIG. 4 is a diagrammatic plan view similar to FIG. 1 showing the frame counter mechanism in relation to the part of the film tracking mechanism shown in FIG. 2.

FIG. 4 shows the tracking member 1 in a position near the end of the movement along the forward portion 3a of the track 3. In this position the tracking member 1 comes into contact with one end of the frame counter lever 7. Further advancement of the film 6 causes movement of the tracking member 1, and hence of the frame counter lever 7, in the direction of arrow 17 into the position 1" shown in FIG. 2. On movement of the frame counter lever 7, the frame counter wheel 9 rotates in the direction of arrow 18. The ratchet 10 engages a notch of the frame counter wheel 9 such that the wheel 9 is prevented from rotating in the opposite direction by the ratchet 10 when the lever 7 is returned to its original position. Since a new frame is brought into position each time the tracking member 1 moves into position 1" (FIG. 2), the number of frames used may be recorded by the position of the wheel 9. The frame counter lever 7 is returned to its original position by the springs 8 and 8' when the tracking member 1 moves out of position 1" (FIG. 2) and along the rear portion 3b of the track 3.

Figure 5:
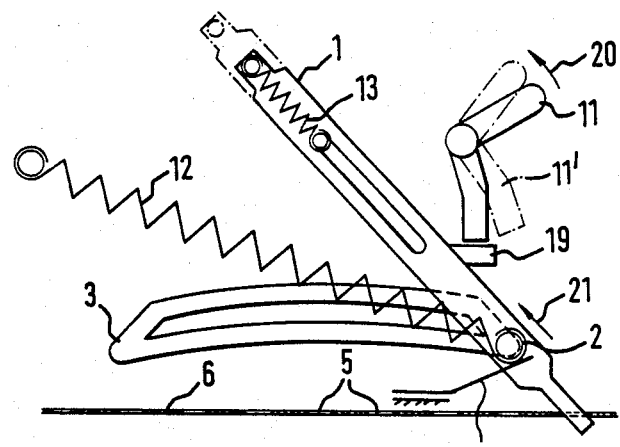
FIG. 5 is a diagrammatic plan view similar to FIG. 1, showing the part of the film tracking mechanism shown in FIG. 2 and the shutter release means.
Figure 6:
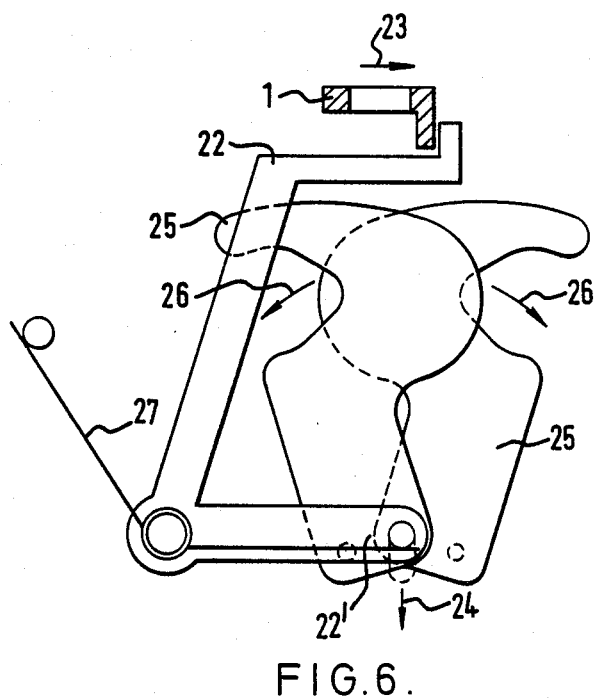
FIG. 6 shows a diagrammatic front view of the shutter actuation means.

FIGS. 5 and 6 show the shutter release and actuation means in detail. The tracking member 1 is held in the position shown in FIG. 5 by the abutment of a stop 19 against the shutter release lever 11. When a photograph is required to be taken, the shutter release lever 11 is pivoted in the direction shown by arrow 20, thus allowing rapid movement of the tracking member 1 in the direction of arrow 21. This movement takes place under the action of the first tension spring 12 and the leaf spring A. The force acting on the tracking pin 1 must be large enough to create tension in the second tension spring 13, but must not be so large that operation of the shutter release lever 11 requires great effort. This may be achieved by the arrangement of the first tension spring 1 at an angle to the direction of arrow 21, and by appropriate selection of the leaf spring A.

The release of the tracking member 1 from position 1" (FIG. 2) allows the tracking pin 2 to move rapidly along the rear portion 3b of the track 3 and the tracking member 1 returns to the original position 1' (FIG. 2). The arrival of the tracking pin 2 at the start of the forward portion of the track 3 causes actuation of the shutter mechanism by the means shown in FIG. 6.

A pivotably mounted lever 22 is displaced by the tracking member 1, moving in the direction shown by arrow 23. An end 22' of the lever 22 moves rapidly in a downward direction indicated by arrow 24. Two shutter blades 25 move apart in directions shown by arrows 26. A lever spring 27 acting on the end 22' of the lever 22 then returns the shutter blades 25 to their closed position. A photograph is taken by this process. The mechanism has then completed one cycle and the film may be advanced again as previously described.

The main advantages of the film tracking mechanism as described are: reduced manufacturing costs due to simplification of the film tracking mechanism; performance of up to four operations by the movement of the single tracking member; employment of the movement of the advancing film to provide energy to operate the film tracking mechanism; and the removal of any risk of double exposure of a frame without the addition of any further mechanical components. The removal of the risk of double exposure is inherent in the design of the film tracking mechanism since a photograph may only be taken after the tracking pin has made a complete circuit of the track. Thus advancement of the film must occur between exposures.

I claim:

1. A film tracking mechanism for a camera, comprising a track having forward and rear portions and defining exclusively a continuous loop, a tracking member, means on said tracking member for slidably and pivotably mounting said tracking member in said camera, a tracking pin on said tracking member engaging said track for slidable movement therealong, means on said tracking member for engagement with a film during movement of said tracking pin along said forward portion, and means for disengaging said tracking member from said film and for moving said tracking pin along said rear portion.

2. A film tracking mechanism for a camera, comprising a track having forward and rear portions, a tracking member, means on said tracking member for slidably and pivotably mounting said tracking member in said camera, a tracking pin on said tracking member engaging said track for slidable movement therealong, means on said tracking member for engagement with a film during movement of said tracking pin along said forward portion, and means for disengaging said tracking member from said film and for moving said tracking pin along said rear portion, said disengaging and moving means comprising at least two resilient members.

3. A film tracking mechanism as claimed in claim 2, wherein said disengaging and moving means comprise a first spring acting on said tracking member for disengaging said tracking member from said film and for moving said tracking pin along said rear portion.

4. A film tracking mechanism as claimed in claim 3, further comprising a second spring action on said tracking member for moving said tracking member towards said film for engagement therewith.

5. A film tracking mechanism as claimed in claim 4, further comprising a third spring for moving said tracking pin into said rear portion from said forward portion.

6. A film tracking mechanism for a camera, comprising a track having forward and rear portions, a tracking member, means on said tracking member for slidably and pivotably mounting said tracking member in said camera, a tracking pin on said tracking member engaging said track for slidable movement therealong, means on said tracking member for engagement with a film during movement of said tracking pin along said forward portion, means for disengaging said tracking member from said film and for moving said tracking pin along said rear portion, means for preventing movement of said tracking pin along said rear portion, and means for releasing said preventing means.

7. A film tracking mechanism for a camera, comprising a track having forward and rear portions, a tracking member, means on said tracking member for slidably and pivotably mounting said tracking member in said camera, a tracking pin on said tracking member engaging said track for slidable movement therealong, means on said tracking member for engagement with a film during movement of said tracking pin along said forward portion, means for disengaging said tracking member from said film and for moving said tracking pin along said rear portion, a shutter mechanism actuable by said tracking member as said tracking pin reaches an end of said rear portion.

8. A film tracking mechanism as claimed in claim 7, wherein said shutter mechanism has a resilient bias member for returning said shutter mechanism to a closed position subsequent to opening.

9. A film tracking mechanism for a camera, comprising a track having forward and rear portions, a tracking member, means on said tracking member for slidably and pivotably mounting said tracking member in said camera, a tracking pin on said tracking member engaging said track for slidable movement therealong, means on said tracking member for engagement with a film during movement of said tracking pin along said forward portion, means for disengaging said tracking member from said film and for moving said tracking pin along said rear portion, a frame counter mechanism operable by said tracking member as said tracking pin is moved along said forward portion.

10. A camera having a shutter mechanism, a frame counter mechanism, film advancement means and a film tracking mechanism, said film tracking mechanism comprising a track having forward and rear portions, a tracking member mounted in said camera for slidable and pivotable movement, a tracking pin on said tracking member engaging said track for slidable movement therealong, a claw on said tracking member for engagement with a film during advancement thereof by said film advancement means to move said tracking pin along said forward portion, a first spring acting on said tracking member for disengaging said claw from said film at an end of said forward portion and for moving said tracking pin along said rear portion, a second spring acting on said tracking member for moving said claw into engagement with said film, a third spring acting on said tracking pin at said end of said forward portion for moving said tracking pin into said rear portion, releasable retaining means for preventing, until released, said tracking pin from entering said rear portion, said shutter mechanism being actuable by means of said tracking member as said tracking pin reaches an end of said rear portion, and said frame counter mechanism being actuable by means of said tracking member as said tracking pin is moved along said forward portion.

* * * * *